No. 709,697. Patented Sept. 23, 1902.
H. C. CHAMBERS.
MEAT REDUCING DEVICE.
(Application filed Mar. 15, 1902.)
(No Model.)
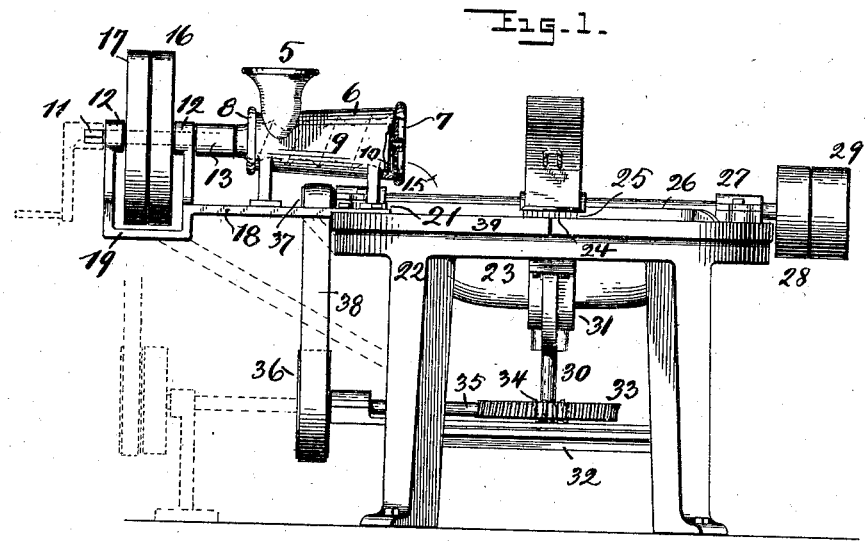
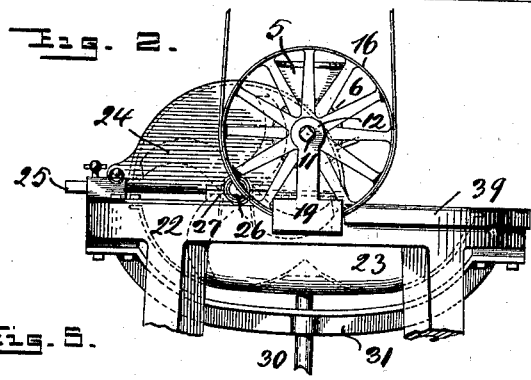
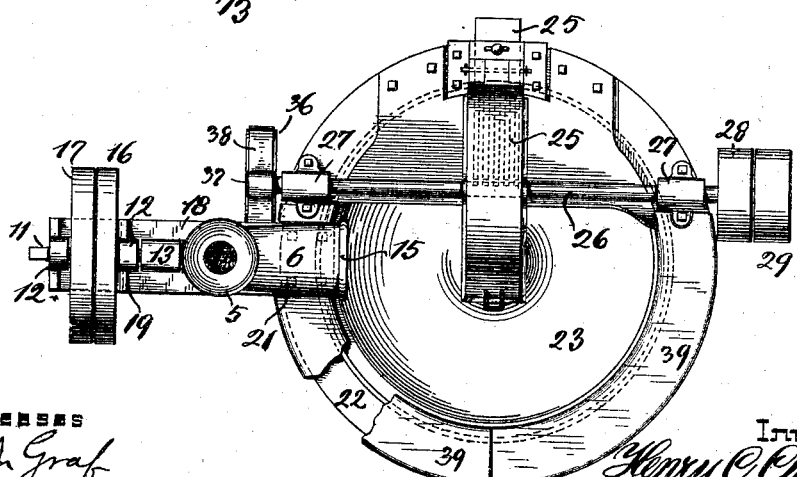
Witnesses
John J. Graf
Arthur Kline
Inventor
Henry C. Chambers
by C. Spengel atty.

UNITED STATES PATENT OFFICE.

HENRY C. CHAMBERS, OF CINCINNATI, OHIO, ASSIGNOR TO THE CINCINNATI BUTCHERS SUPPLY CO., OF CINCINNATI, OHIO.

MEAT-REDUCING DEVICE.

SPECIFICATION forming part of Letters Patent No. 709,697, dated September 23, 1902.

Application filed March 15, 1902. Serial No. 98,276. (No model.)

*To all whom it may concern:*

Be it known that I, HENRY C. CHAMBERS, a citizen of the United States, and a resident of the city of Cincinnati, in the county of Hamilton and State of Ohio, have invented a certain new and useful Meat-Reducing Device; and I do declare the following to be a clear, full, and exact description thereof, attention being called to the accompanying drawings, with the reference-numerals marked thereon, which form also a part of this specification.

This invention relates to improvements in meat-reducing machines whereby meat is prepared for sausage and similar purposes.

The invention consists of the means and construction used for combining a preliminary cutter, whereby the tougher substances—fibers, sinews, &c.—are cut up, with a finishing-cutter, in which the final reduction takes place, the first cutter supplying the second one.

In the following specification, and particularly pointed out in the claim, is found a full description of the invention, together with its operation, parts, and construction, which latter is also illustrated in the accompanying drawings, in which—

Figure 1 is a front elevation of my meat-reducing machine. Fig. 2 is a side elevation thereof, showing the upper part of the same as it appears when viewed from the left of Fig. 1. Fig. 3 is a top view of the same. Fig. 4 is a detached detail view of the drive-shaft of the preliminary cutter with parts broken away, and Fig. 5 is an end view thereof.

The preliminary cutter consists of a hopper 5, by means of which the meat is introduced into a housing 6, the open end of which is closed by a perforated plate 7. In this end and the one 8 opposite thereto there is mounted a screw-shaft 9, by which the meat is crowded against plate 7 and forced through the perforations thereof, the reduction taking place by knives 10, mounted on shaft 9 and rotating close against the inside of plate 7, cutting the meat as it passes through the perforations of said plate. The combined screw and cutter-shaft 9 is rotated by means of a drive-shaft 11, mounted in bearings 12, the connection between the two shafts being detachable by means of a coupling 13, forming part of shaft 11 and provided with a socket which receives the end of shaft 9. This socket consists of an inserted piece 14, which is otherwise than round, thereby insuring rotation of the connected shafts, while at the same time permitting removal of shaft 9, which becomes necessary for cleaning housing 6 or for access to the knives. This inserted piece is held in place by a pin or set-screw. For such access plate 7 is removed, the same being held in place by a ring 15, detachably connected to the end of housing 6 by means of a screw connection. Shaft 11 is driven by a pulley 16, there being preferably also a loose pulley 17, the power being taken from a line or counter shaft. This cutter, as described, is mounted on a base-plate 18, being a lateral extension from a frame 19, which contains also bearings 12. This plate 18 serves also as the means whereby by means of bolts 21 this preliminary cutter is attached to the frame 22 of the finishing-cutter. This latter consists, substantially, of a rotary bowl 23, into which the meat discharged from the preliminary cutter is fed and which meat is again acted upon and finished by a number of knives 24, cutting against a suitable comb 25 and mounted on a shaft 26, supported in bearings 27, which rest also on top of frame 22. The upper part of the knives is usually covered and protected by a hood. By reason of the rotation of bowl 23 the meat contained therein and received from the preliminary cutter may be repeatedly acted upon by the knives and until it is finished, which repeated action is not possible in the preliminary cutter unless repeatedly returning it again through hopper 5. The knife-shaft is rotated by means of a pulley 28, there being also a loose pulley 29, the power coming, preferably, from the same source from which pulley 16 of the preliminary cutter is driven. Bowl 23 is supported and rotated in any suitable manner—as, for instance, as shown, it being carried on a shaft 30, supported in bearings on frames 31 32. This shaft 30 is rotated by a worm-wheel 33, driven by a worm 34 on a shaft 35. This latter is rotated by a pulley 36, driven by a pulley 37, mounted on the knife-shaft and connected to the former pulley by a belt 38. For driving pulley 16 of the preliminary cutter one of the shafts of the finishing-cutter—as, for instance, worm-shaft 35—might be extended and used for such purpose, as shown in dotted lines in Fig. 1.

To prevent meat from entering the space between the rotary bowl 23 and the stationary frame 22, I provide a sectional top plate or apron 39, resting on frame 22 and covering this space. At the place where plate 18 is attached to frame 22 this apron is omitted, such base-plate taking the place of it. The shape of base-plate 18 might be modified in various ways to suit the particular shape of the frame of the finishing-cutter. It might also be in shape of a bracket, as shown in dotted lines in Fig. 1.

The means used to reduce the meat and the openings through which the same after reduction discharges into the finishing-cutter may be more or less modified as to location and number. The preliminary cutter may also be operated by a crank, and the meat after reduction may discharge therefrom simply through an outlet-opening.

Reverting to the statement of invention at the beginning, it is to be noted that no invention is claimed in the combination, broadly, of two cutters nor in the construction of either of them as a cutter, but merely in the means whereby these two cutters are combined and in such changes on them as to render them capable of entering into combination with these means and which means consist of the bracket or base-plate 18, adapted to be attached to the frame of one of the cutters, serving also as a means to support the other cutter and containing, further, the bearings for the drive-shaft of this latter cutter.

Having described my invention, I claim as new—

The combined attaching-plate and supporting-base whereby in a meat-reducing device consisting of a preliminary and a finishing cutter, the first cutter is supported and attached to the second cutter, said combined plate and base disposed in a horizontal direction and adapted for attachment at one end to the finishing-cutter and having at its other end a frame 19 which is provided with bearings 12, 12, adapted to support the driving-shaft of the preliminary cutter.

In testimony whereof I hereunto set my signature in the presence of two witnesses.

HENRY C. CHAMBERS.

Witnesses:
C. SPENGEL,
ARTHUR KLINE.